(12) United States Patent
Lang et al.

(10) Patent No.: US 11,081,871 B2
(45) Date of Patent: Aug. 3, 2021

(54) FIGURE-OF-EIGHT CABLE

(71) Applicant: Prysmian S.p.A., Milan (IT)

(72) Inventors: Ian Dewi Lang, Milan (IT); Paul John Roberts, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/331,569

(22) PCT Filed: Sep. 14, 2016

(86) PCT No.: PCT/EP2016/071670
§ 371 (c)(1),
(2) Date: Mar. 8, 2019

(87) PCT Pub. No.: WO2018/050219
PCT Pub. Date: Mar. 22, 2018

(65) Prior Publication Data
US 2019/0222014 A1 Jul. 18, 2019

(51) Int. Cl.
| | | |
|---|---|---|
| *H02G 7/00* | (2006.01) | |
| *H02G 7/10* | (2006.01) | |
| *G02B 6/44* | (2006.01) | |
| *H02G 3/04* | (2006.01) | |
| *H01B 11/00* | (2006.01) | |
| *H01B 9/00* | (2006.01) | |

(52) U.S. Cl.
CPC .............. *H02G 7/10* (2013.01); *G02B 6/4422* (2013.01); *G02B 6/4433* (2013.01); *H02G 3/0487* (2013.01); *G02B 6/443* (2013.01); *G02B 6/4432* (2013.01); *H01B 9/005* (2013.01); *H01B 11/007* (2013.01)

(58) Field of Classification Search
CPC ...... H02G 7/10; H02G 3/0487; G02B 6/4422; G02B 6/4433; G02B 6/443; G02B 6/4432; H01B 9/005; H01B 11/007
See application file for complete search history.

(56) References Cited

U.S. PATENT DOCUMENTS

| | | | | |
|---|---|---|---|---|
| 4,763,983 | A * | 8/1988 | Keith | G02B 6/4422 |
| | | | | 156/158 |
| 5,189,718 | A * | 2/1993 | Barrett | G02B 6/4416 |
| | | | | 174/117 R |

(Continued)

OTHER PUBLICATIONS

International Search Report and Written Opinion of corresponding International Application No. PCT/EP2016/071670 dated May 26, 2017; 8 pages.

*Primary Examiner* — Pete T Lee
(74) *Attorney, Agent, or Firm* — Shumaker, Loop & Kendrick, LLP

(57) ABSTRACT

It is disclosed a figure of eight cable comprising a first cable element comprising a first core enclosed by a first outer sheath, a second cable element comprising a second core enclosed by a second outer sheath and a web joining the first and second outer sheaths so as to provide the cable with a major plane of symmetry X which comprises the longitudinal axes of the first and second cable elements. The cable also comprises at least one strength member embedded within the first or second outer sheath. All the strength members of the cable are substantially located on the major plane of symmetry X of the cable.

14 Claims, 2 Drawing Sheets

(56) References Cited

U.S. PATENT DOCUMENTS

| | | | | |
|---|---|---|---|---|
| 5,970,196 | A | * 10/1999 | Greveling | G02B 6/4404 |
| | | | | 385/100 |
| 6,356,690 | B1 | * 3/2002 | McAlpine | G02B 6/4422 |
| | | | | 385/100 |
| 6,363,192 | B1 | * 3/2002 | Spooner | G02B 6/4416 |
| | | | | 174/115 |
| 6,370,303 | B1 | * 4/2002 | Fitz | G02B 6/4422 |
| | | | | 385/113 |
| 6,400,873 | B1 | 6/2002 | Gimblet et al. | |
| 6,529,662 | B1 | * 3/2003 | Kobayashi | G02B 6/4432 |
| | | | | 385/112 |
| 6,671,441 | B1 | * 12/2003 | Bocanegra | G02B 6/443 |
| | | | | 385/112 |
| 7,106,931 | B2 | 9/2006 | Sutehall et al. | |
| 7,218,821 | B2 | * 5/2007 | Bocanegra | G02B 6/4422 |
| | | | | 385/103 |
| 2002/0062978 | A1 | * 5/2002 | Sakabe | G02B 6/4422 |
| | | | | 174/115 |

* cited by examiner

FIGURE-OF-EIGHT CABLE

CROSS-REFERENCE TO RELATED APPLICATION

This application claims priority to International Application No. PCT/EP2016/071670 filed on Sep. 14, 2016, the contents of which is hereby incorporated in the entirety.

TECHNICAL FIELD AND BACKGROUND OF THE INVENTION

The present invention relates to the field of figure-of-eight cables, in particular, to an electrical and optical figure-of-eight cable for aerial installation. As known, a cable for aerial installation is a cable comprising electrical and/or optical conductors and designed to be suspended in catenary through poles in order to connect customers' premises. These types of cables are generally called "drop cables".

Historically, data transmission was provided by drop cables with insulated electrical conductors typically arranged in pairs or quads. Then, electrical conductors have been replaced by optical fibers, which support data transmission at much higher rates.

Drop cables may comprise both electrical conductors and optical conductors. In such drop cables, while the optical conductors are dedicated to data transmission, electrical conductors may provide an electrical supply which may be used in emergency situations, e.g. when the mains electrical supply to the customer's premises has been interrupted.

A drop cable for aerial installation typically comprises a strength member to support the optical and/or electrical conductors as the cable is suspended in catenary. The strength member(s) may be embedded within the thickness of the cable sheath. This arrangement however makes mid-span access to optical and/or electrical conductors of the cable difficult, since it requires the strength member(s) to be cut through.

A known technique for easing mid-span access to optical and/or electrical conductors is making use of a "figure-of-eight" cable construction. A "figure-of-eight" cable is formed by two parallel, longitudinally joined cable elements with circular cross sections, so that the cable cross section is in the shape of an "8". One cable element may house the optical and/or electrical conductors of the cable, while the other cable element may house the strength member(s) supporting the cable. The "figure-of-eight" cable construction also results in a cable with reduced size in comparison to cables with strength members embedded within the sheath thickness.

Alternatively, a "figure-of-eight" cable may be formed by one cable element housing the electrical conductors, while the other cable element houses the optical conductors and the strength member(s) supporting the cable.

U.S. Pat. No. 7,106,931 describes a drop cable including a sheathing having a first portion defining a passage for optical fibers and containing strength members for supporting the cable in a suspension installation and a second portion separable from the first portion and containing a plurality of electrical conductors. The strength members are disposed in a plane P1 extending perpendicular to a plane P2 passing through the longitudinal axes of the first and a second sheathing portions. According to a variant, four strength members are disposed on a common pitch circle and are spaced at 90° intervals on that circle, such that a plane passing through the longitudinal axes of the first and second sheathing portions passes through the longitudinal axis of two strength members and a second plane perpendicular to that plane passes through the longitudinal axes of the other two strength members.

SUMMARY OF THE INVENTION

The Applicant has noticed that the cable of U.S. Pat. No. 7,106,931 exhibits some drawbacks. In particular, the applicant has found that the cable of U.S. Pat. No. 7,106,931 is disadvantageously highly unstable when it is bent or wound on a drum. In the present description and in the claims, the expression "cable instability" means the preference of a cable to bend in an orientation different from the imposed one and to bend according to such different orientation with little or no external influence. In particular, a cable preferentially bends in a plane of minimal rigidity. If the cable of U.S. Pat. No. 7,106,931 is bent in the plane containing its strength members, the rigidity of the second sheathing portion will oppose to such bending and will cause the cable to twist and oppose to imposed bend, leading the cable to instability with the consequence of winding/unwinding process on drums uneven and slow. In the variant having four strength members, the instability becomes even worse, when the cable is wound on a drum, because two conflicting preferential orthogonal bending planes are provided.

The Applicant has tackled the problem of providing a figure of eight cable comprising a single preferential bending plane so as to cause the cable to be more stable when it is wound on a drum.

The Applicant has found a figure of eight cable comprising two cable elements arranged parallel and longitudinally joined together, so that the cable has a major plane of symmetry which comprises the longitudinal axes of the two cable elements, wherein at least one strength member is embedded within the thickness of the sheath of at least one of the cable elements, all the strength members of the cable being substantially located on the major plane of symmetry of the cable.

The present invention, therefore, relates to a figure of eight cable comprising a first cable element with a first core and a first outer sheath enclosing the first core, a second cable element comprising a second core and a second outer sheath enclosing the second core, a web joining the first and the second outer sheath so as to provide the cable with a major plane of symmetry X comprising the longitudinal axes of the first and second cable elements; and at least one strength member embedded within the first outer sheath or the second outer sheath, wherein all the strength members of the cable are substantially located on the major plane of symmetry of the cable.

This way, all the strength members of the cable are substantially aligned with the transmission cores of the cable. This results in a single preferential bending plane for the drop cable, which is accordingly much stable when it is bent or wound on a drum lying on the drum consistently.

Preferably, the cable comprises two strength members embedded within the first outer sheath or the second outer sheath.

Preferably, the two strength members are arranged at substantially diametrically opposed positions within the first outer sheath or the second outer sheath.

Preferably, all the strength members comprised in the cable are located within an angular distance lower than 20° from the major plane of symmetry of the cable.

Preferably, at least one strength member is embedded within the thickness of the second outer sheath enclosing the second core.

Preferably, the first core is an electrical core and comprises at least two stranded insulated electrical conductors.

Preferably, the second core is an optical core and comprises at least one optical fiber.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF THE INVENTION

Figure 1:
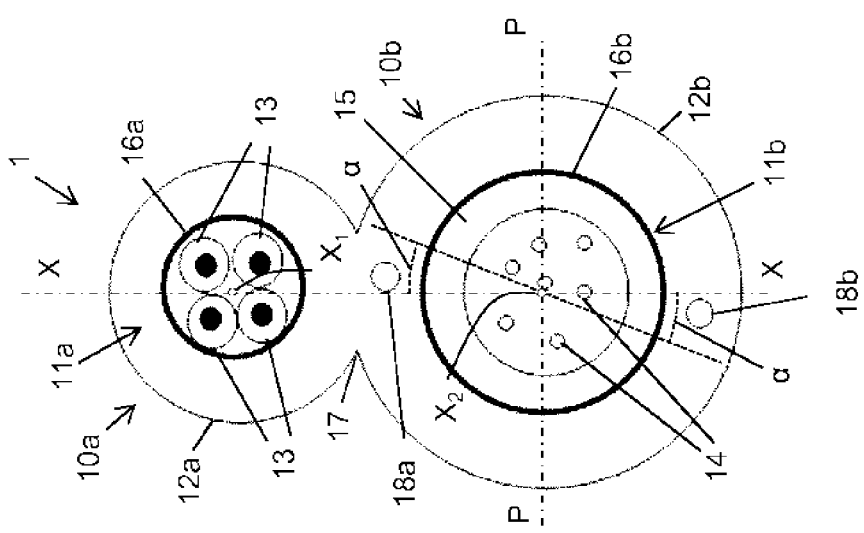

FIG. 1 schematically shows a figure of eight cable 1 according to a first embodiment of the present invention.

The cable 1 comprises two cable elements 10a and 10b longitudinally extended along respective longitudinal axes $X_1$ and $X_2$. Each cable element 10a, 10b preferably comprises a transmission core 11a, 11b and an annular outer sheath 12a, 12b enclosing the transmission core 11a, 11b. The cable 1 also comprises a web 17 longitudinally joining the outer sheaths 12a, 12b so as to provide the cable 1 with a "figure-of-eight" construction having a major plane of symmetry X comprising the longitudinal axes $X_1$ and $X_2$. The outer sheaths 12a, 12b and web 17 are preferably made of a polymeric material, e.g. PE (polyethylene), PA (polyamide), HDPE (High Density Polyethilene) or LDPE (Low Density Polyethylene).

According to the first embodiment, the transmission core 11a of the cable element 10a is an electrical core comprising a number of insulated conductors 13, e.g. four stranded copper wires. The conductors 13 may be used for telecommunication or power purposes or both. For example, a pair of conductors 13 can be used for telecommunication purpose and another pair of conductors 13 can be used for power purpose.

The transmission core 11b of the cable element 10b preferably is an optical core comprising a number of (preferably 2 to 24) optical fibers 14. The optical fibers 14 are preferably S-Z stranded and loosely arranged in a tube 15. The tube 15 is preferably made of a polymeric material, e.g. PBT (polybutylene terephthalate). The tube 15 with the optical fibers 14 loosely arranged therein is preferably tightly buffered in the outer sheath 12b. The tube 15 is preferably filled with gel.

Preferably, each cable element 10a, 10b also comprises a barrier tape 16a, 16b interposed between the transmission core 11a, 11b and the outer sheath 12a, 12b. The barrier tapes 16a, 16b preferably comprise a polymeric material, e.g. a polyester.

The outer sheath 12a housing the electrical core 11a preferably has an outer diameter shorter than the outer diameter of the outer sheath 12b housing the optical core 11b.

The cable 1 comprises at least one strength member substantially located on the major plane of symmetry X. In the present description and in the claims, the expression "substantially located" or "substantially aligned" means that the angular distance a between the major plane of symmetry X of the cable 1 and a plane containing both the axis of the strength member and the longitudinal axis $X_1$ or $X_2$ of the cable element 10a or 10b comprising the strength member is lower than 45°.

According to a preferred embodiment, the angular distance a is lower than 20°, more preferably lower than 10°, even more preferably lower than 5°.

According to the first embodiment shown in FIG. 1, the cable 1 preferably comprises two strength members 18a, 18b embedded within the thickness of the outer sheath of the 12b of the cable element 10b, close to the plane of symmetry X, at substantially diametrically opposed positions. The strength members 18a, 18b may be metallic. For instance, each strength member 18a, 18b may comprise three stranded wires of brass clad steel. In this case, at least one of the strength members 18a, 18b may optionally comprise additional copper wires for telecommunication or power supply purposes. Alternatively, the strength members may be non metallic, e.g. they may be aramid strength members or they may comprise CNT (carbon nanotubes) or graphene.

Since the strength members 18a, 18b are substantially located on the major plane of symmetry X, they are substantially aligned with the transmission cores 11a, 11b of the cable 1. Hence, advantageously, the cable 1 exhibits a single preferential bending plane, which is the plane P perpendicular to the major plane of symmetry X. The cable 1 is therefore advantageously very stable when it is bent or wound on a drum.

Figure 2:
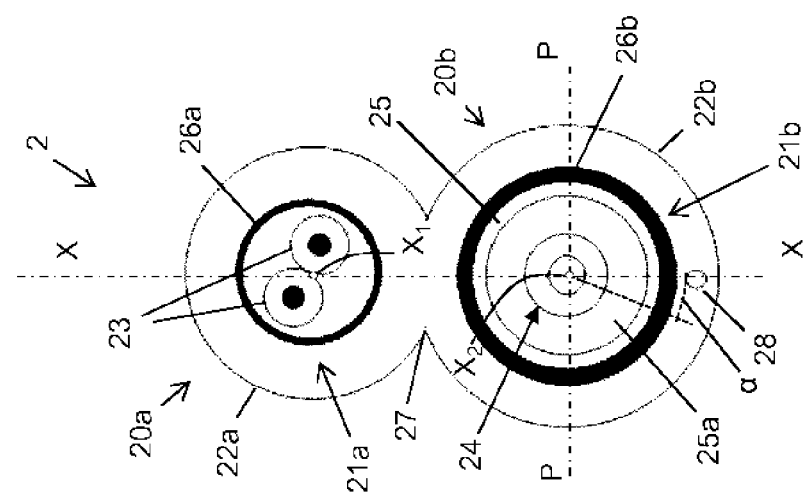

FIG. 2 schematically shows a cable 2 according to a second embodiment of the present invention.

Similarly to cable 1, the cable 2 comprises: a cable element 20a with an electrical core 21a, an outer sheath 22a and a barrier tape 26a; a cable element 20b with an optical core 21b, an outer sheath 22b and a barrier tape 26b; and a web 27 longitudinally joining the outer sheaths 22a, 22b so as to provide the cable 2 with a "figure-of-eight" construction having a major plane of symmetry X.

According to the second embodiment, the electrical core 21a comprises only two stranded insulated conductors 23.

Further, according to the second embodiment, the optical core 21b comprises a single optical fiber 24 tightly buffered in a tube 25. The tube 25 preferably comprises an LSOH (Low Smoke Zero Halogen) material and is preferably filled with aramid yarns 25a. The tube 25 with the optical fiber 24 tightly buffered therein is preferably tightly buffered in the outer sheath 22b.

Further, according to the second embodiment, the cable 2 comprises a single strength member 28 substantially located on the major plane of symmetry X. The strength member 28 is preferably embedded within the thickness of the outer sheath 22b of the cable element 20b, close to the plane of symmetry X, at a position substantially diametrically opposed to that of the web 27. This arrangement of the strength member 28 advantageously eases the cable stripping.

Hence, also according to the second embodiment the strength member 28—being substantially located on the major plane of symmetry X of the cable 2—is substantially aligned with the electrical core 21a and optical core 21b, so that the cable 2 exhibits a single preferential bending plane P perpendicular to the major plane of symmetry X. Also the cable 2 is therefore advantageously very stable when it is bent or wound on a drum.

Figure 3:
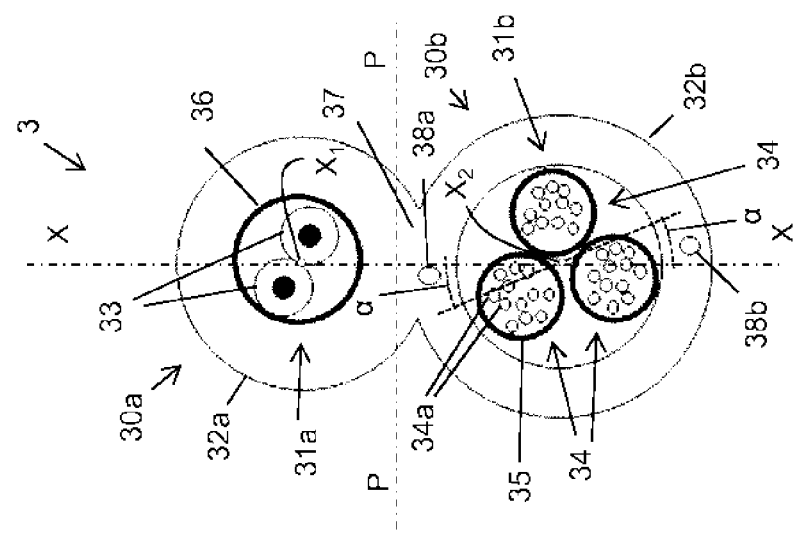
FIGS. 1-6 schematically shows different embodiments of figure of eight cables according to various embodiments of the present invention.

FIG. 3 schematically shows a cable 3 according to a third embodiment of the present invention.

Similarly to cable 2, the cable 3 comprises: a cable element 30a with an electrical core 31a including two stranded insulated conductors 33, an outer sheath 32a and a barrier tape 36; a cable element 30b with an optical core 31b and an outer sheath 32b; and a web 37 longitudinally joining the outer sheaths 32a, 32b so as to provide the cable 3 with a "figure-of-eight" construction having a major plane of symmetry X.

According to the third embodiment, the optical core 31b comprises a number of (three, by way of example) fiber units 34. Each fiber unit 34 preferably comprises a number of (preferably, 2 to 24) optical fibers 34a and a retaining element 35 enclosing the optical fibers 34a. The optical fibers 34a are preferably S-Z stranded and loosely arranged in the retaining element 35. The retaining element 35 is preferably made of a polymeric material, e.g. acrylate. The fibers units 34 are preferably S-Z stranded and are loosely arranged within the outer sheath 32b.

According to the third embodiment, the cable 3 comprises two strength members 38a, 38b substantially located on the major plane of symmetry X. The strength members 38a, 38b are preferably embedded within the thickness of the outer sheath 32b of the cable element 30b, close to the plane of symmetry X, at substantially diametrically opposed positions.

Hence, also according to the third embodiment the strength members 38a, 38b—being substantially located on the major plane of symmetry X of the cable 3—are substantially aligned with the electrical core 31a and optical core 31b, so that the cable 3 exhibits a single preferential bending plane P perpendicular to the major plane of symmetry X. Also the cable 3 is therefore advantageously very stable when it is bent or wound on a drum.

Figure 4:
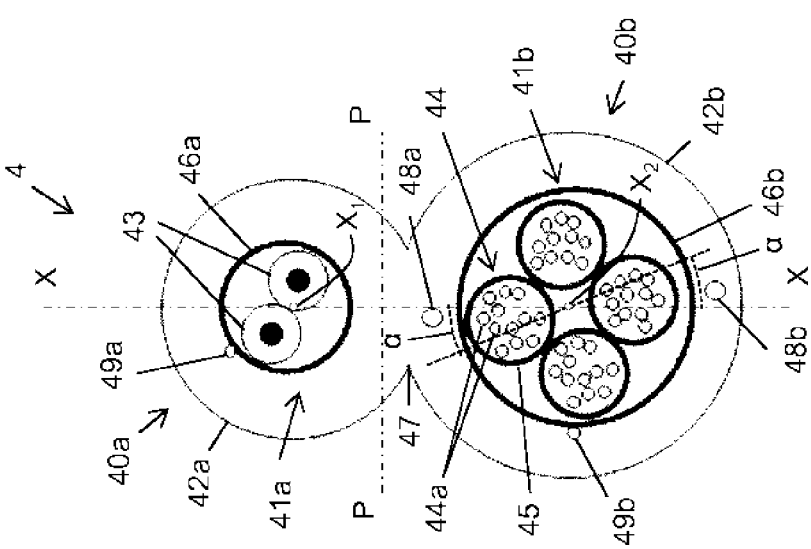

FIG. 4 schematically shows a cable 4 according to a fourth embodiment of the present invention.

Similarly to cable 3, the cable 4 comprises: a cable element 40a with an electrical core 41a including two stranded insulated conductors 43, an outer sheath 42a and a barrier tape 46a; a cable element 40b with an optical core 41b and an outer sheath 42b; a web 47 longitudinally joining the outer sheaths 42a, 42b so as to provide the cable 4 with a "figure-of-eight" construction having a major plane of symmetry X; and two strength members 48a, 48b embedded within the thickness of the outer sheath 42b of the cable element 40b, close to the plane of symmetry X, at substantially diametrically opposed position.

According to the fourth embodiment, the optical core 41b comprises four fiber units 44, each fiber unit 44 comprising a number of optical fibers 44a and a retaining element 45 as described above.

Further, according to the fourth embodiment, the cable element 40b comprises a barrier sheath 46b interposed between the optical core 41b and the outer sheath 42b. The barrier sheath 46b preferably comprises PE (polyethylene) and an LSOH material.

Further, according to the fourth embodiment, the cable 4 optionally comprises two ripcords 49a, 49b. Each ripcord 49a, 49b is preferably embedded in the thickness of the outer sheath 42a, 42b, next to the inner surface thereof.

Also according to the fourth embodiment the strength members 48a, 48b—being substantially located on the major plane of symmetry X of the cable 4—are substantially aligned with the electrical core 41a and optical core 41b, so that the cable 4 exhibits a single preferential bending plane P perpendicular to the major plane of symmetry X. Also the cable 4 is therefore advantageously very stable when it is bent or wound on a drum.

Figure 5:
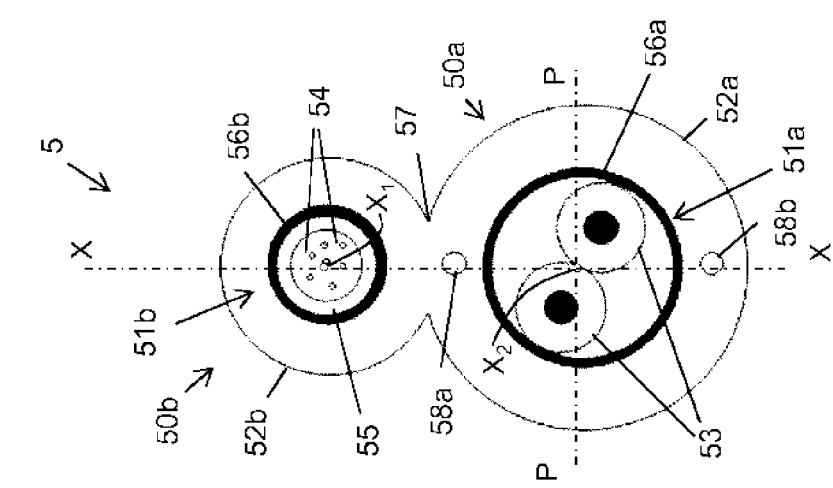

FIG. 5 schematically shows a cable 5 according to a fifth embodiment of the present invention.

Similarly to cable 1, the cable 5 comprises: a cable element 50a with an electrical core 51a including stranded insulated conductors 53, an outer sheath 52a and a barrier tape 56a; a cable element 50b with an optical core 51b including a number of optical fibers 54 loosely arranged in a tube 55 as described above, an outer sheath 52b and a barrier tape 56b; a web 57 longitudinally joining the outer sheaths 52a, 52b so as to provide the cable 5 with a "figure-of-eight" construction having a major plane of symmetry X; and two strength members 58a, 58b substantially located on the major plane of symmetry X.

However, according to the fifth embodiment, the outer sheath 52a housing the electrical core 51a preferably has an outer diameter larger than the outer diameter of the outer sheath 52b housing the optical core 51b.

Further, according to the fifth embodiment, the strength members 58a, 58b are preferably embedded within the thickness of the outer sheath 52b close to the plane of symmetry X, at substantially diametrically opposed position.

Hence, also according to the fifth embodiment the strength members 58a, 58b—being substantially located on the major plane of symmetry X of the cable 5—are substantially aligned with the electrical core 51a and optical core 51b, so that the cable 5 exhibits a single preferential bending plane P perpendicular to the major plane of symmetry X. Also the cable 5 is therefore advantageously very stable when it is bent or wound on a drum.

Figure 6:
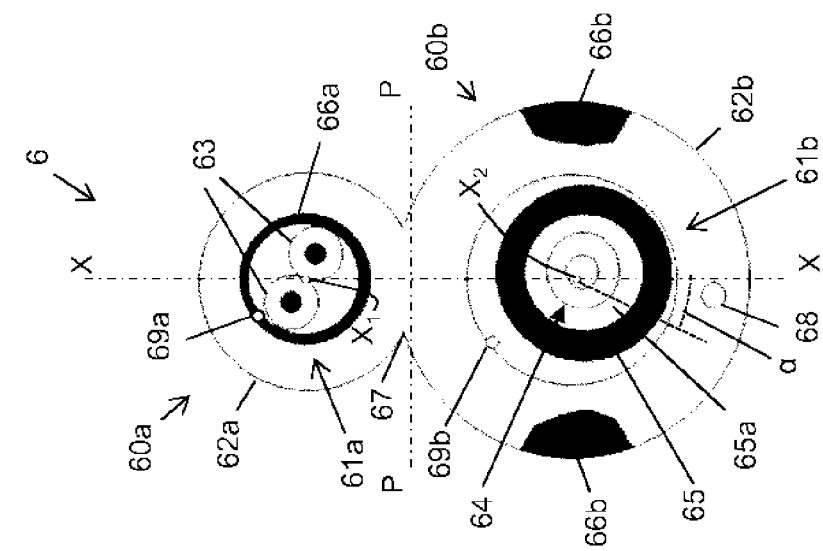

FIG. 6 schematically shows a cable 6 according to a sixth embodiment of the present invention.

Similarly to cable 2 of the second embodiment, the cable 6 comprises: a cable element 60a with an electrical core 61a including two stranded insulated conductors 63, an outer sheath 62a and a barrier tape 66a; a cable element 60b with an optical core 61b including a single optical fiber 64 tightly buffered in a tube 65 filled with aramid yarns 65a as described above; a web 67 longitudinally joining the outer sheaths 62a, 62b so as to provide the cable 6 with a "figure-of-eight" construction having a major plane of symmetry X; and a strength member 68 (preferably, a dielectric strength member, e.g. an aramid strength member) embedded within the thickness of the outer sheath 62b close to the plane of symmetry X, at a position substantially diametrically opposed to that of the web 67.

According to the sixth embodiment, the tube 65 with the optical fiber 64 tightly buffered therein is loosely housed within the outer sheath 62b.

Further, according to the sixth embodiment, the outer sheath 62b of the cable element 60b is made of a first material and preferably comprises two portions 66b made of a second different material. The portions 66b are preferably accessible from outside the cable 6 and are preferably arranged at diametrically opposed positions, on a plane substantially perpendicular to the major plane of symmetry X.

Preferably, the first material has a higher fracture toughness than the second material, in order to ease removal of the outer sheath 62b. The first and second materials are preferably compatible from the mechanical point of view in particular, they exhibit substantially the same hardness and properties of reciprocal adhesion. In particular, the first and second materials are preferably different mixtures comprising a same compound, e.g. polyethylene. In addition to such compound, the first material comprises a further compound increasing its fracture resistance, e.g. polypropylene. This provides the outer sheath 62b with mechanical stability.

Preferably, the first and second materials have different colors, in order to allow visual identification of the portions 66b.

Further, according to the sixth embodiment, the cable 6 may optionally comprise two ripcords 69a, 69b. Each ripcord 69a, 69b is preferably embedded in the thickness of the outer sheath 62a, 62b, next to the inner surface thereof.

Hence, also according to the sixth embodiment the strength member 68, being substantially located on the major plane of symmetry X of the cable 6, is substantially aligned with the electrical core 61a and optical core 61b, so that the cable 6 exhibits a single preferential bending plane P perpendicular to the major plane of symmetry X. Also the cable 6 is therefore advantageously very stable when it is bent or wound on a drum.

In all the described embodiments, the strength members are embedded in the thickness of the outer sheath having the largest outer diameter, which in most cases houses the optical core (except in the embodiment of FIG. 5). However, according to embodiments not shown in the drawings, the strength members may be embedded in the thickness of the outer sheath having the smaller outer diameter, which in most cases houses the electrical core.

Further, all the above described embodiments comprise one or two strength members. According to other embodiments not shown in the drawings, for instance, four strength members may be envisaged, namely two per each cable element of the cable, provided they are all substantially located on the major symmetry of plane of the cable.

Further, all the above described embodiments comprise two cable elements only. According to other embodiments not shown in the drawings, the cable may comprise three or more cable elements, for instance a larger central cable element with an optical core and two smaller side cable elements with electrical cores. The side cable elements are joined to the central cable elements at diametrically opposed positions by means of respective webs. The three cable elements shall be aligned so that a major plane of symmetry of the cable comprising the longitudinal axes of the three cable elements may be identified. Such cable may comprise one or more strength members, which may be embedded within the thickness of the outer sheath of any of the cable elements. For instance, two strength members may be embedded within the thickness of the outer sheath of the central cable element, at diametrically opposed positions so that they are both substantially located on the major plane of symmetry of the cable, and thus substantially aligned with all the transmission cores of the cable.

The invention claimed is:

1. A figure of eight cable comprising:
a first cable element longitudinally extending along a first longitudinal axis and comprising a first core and a first outer sheath enclosing said first core, wherein said first core is an electrical core and comprises at least two stranded insulated electrical conductors;
a second cable element longitudinally extending along a second longitudinal axis and comprising a second core and a second outer sheath enclosing said second core, wherein said second core is an optical core and comprises at least one optical fiber;
a web joining said first outer sheath and said second outer sheath so as to provide said cable with a major plane of symmetry comprising the longitudinal axes of the first and second cable elements, wherein the web, the first outer sheath, and the second outer sheath are formed as a monolithic structure; and
at least one strength member embedded within said first outer sheath or said second outer sheath,
wherein all strength members comprised in said cable are substantially located on said major plane of symmetry;
wherein said cable includes only one strength member; and
wherein said one strength member is disposed within said first outer sheath or said second outer sheath at a position diametrically opposing said web.

2. The cable according to claim 1, wherein it comprises two strength members embedded within said first outer sheath or said second outer sheath.

3. The cable according to claim 2, wherein said two strength members are arranged at substantially diametrically opposed positions within said first outer sheath or said second outer sheath.

4. The cable according to claim 1, wherein said at least one strength member is embedded within the thickness of said second outer sheath enclosing said second core.

5. The cable according to claim 1, wherein said all strength members comprised in said cable are located within an angular distance lower than 20° from said major plane of symmetry of said cable.

6. The cable according to claim 1, wherein said first core includes at least one first conductor and said second core includes at least one second conductor.

7. The cable according to claim 6, wherein said first core includes a first barrier tape surrounding all of said first conductors, and wherein all of said strength members are disposed exterior to said first barrier tape.

8. The cable according to claim 7, wherein said second core includes a second barrier tape surrounding all of said second conductors, and wherein all of said strength members are disposed exterior to said second barrier tape.

9. The cable according to claim 1, wherein said cable includes at least one ripcord embedded within at least one said first outer sheath or said second outer sheath.

10. The cable according to claim 9, wherein each of said ripcords is offset from said major plane of symmetry of said cable.

11. The cable according to claim 1, wherein said cable includes at least one portion disposed on an exterior of said second outer sheath, wherein said second outer sheath is formed from a first material and said at least one portion is formed from a second material different from said first material.

12. The cable according to claim 11, wherein said first material has a higher fracture toughness than said second material.

13. The cable according to claim 11, wherein said cable includes two of said portions disposed on said exterior of said second outer sheath.

14. The cable according to claim 13, wherein said two of said portions are disposed diametrically opposed to each other at opposite sides of said second outer sheath with a plane extending through said two of said portions arranged perpendicular to said major plane of symmetry of said cable.

* * * * *